(12) United States Patent
Lehmann

(10) Patent No.: US 8,692,186 B2
(45) Date of Patent: Apr. 8, 2014

(54) METHOD AND APPARATUS FOR LEAK TESTING CONTAINERS

(75) Inventor: Martin Lehmann, Wohlen (CH)

(73) Assignee: Wilco AG, Wohlen (CH)

( * ) Notice: Subject to any disclaimer, the term of this patent is extended or adjusted under 35 U.S.C. 154(b) by 353 days.

(21) Appl. No.: 12/914,353

(22) Filed: Oct. 28, 2010

(65) Prior Publication Data

US 2012/0037796 A1    Feb. 16, 2012

Related U.S. Application Data

(63) Continuation-in-part of application No. 12/869,492, filed on Aug. 26, 2010, now abandoned.

(30) Foreign Application Priority Data

Aug. 10, 2010  (EP) .................................... 10172402

(51) Int. Cl.
*G01M 3/04* (2006.01)
*H01J 47/00* (2006.01)

(52) U.S. Cl.
USPC .................... 250/282; 250/281; 73/40; 73/41

(58) Field of Classification Search
USPC ................ 250/281, 282, 288, 289; 73/37, 40, 73/40.7, 41
See application file for complete search history.

(56) References Cited

U.S. PATENT DOCUMENTS

| 2,567,215 A | 9/1951 | Hyman |
| 3,837,228 A | 9/1974 | Nemeth et al. |
| 4,184,362 A | 1/1980 | Standley et al. |
| 5,029,464 A | 7/1991 | Lehmann |
| 5,170,660 A | 12/1992 | Lehmann |

(Continued)

FOREIGN PATENT DOCUMENTS

| DE | 33 40 353 A1 | 5/1985 |
| EP | 0 791 814 A2 | 8/1997 |
| WO | WO 99/46572 A1 | 9/1999 |

OTHER PUBLICATIONS

SIFT-MS Selected Ion Flow Tube Mass Spectrometry; (Technology overview); pp. 1-7.

(Continued)

*Primary Examiner* — Robert Kim
*Assistant Examiner* — Hanway Chang
(74) *Attorney, Agent, or Firm* — Antonelli, Terry, Stout & Kraus, LLP.

(57) ABSTRACT

Closed containers which are filled with a consumer product are tested on leakiness by means of mass spectrometry (10) in that an impact (AN(P)) by the consumer product (P) upon the surrounding atmosphere (A(P)) of the container to be leak tested is monitored by the mass spectrometry (10).

28 Claims, 7 Drawing Sheets

(56) References Cited

U.S. PATENT DOCUMENTS

| | | |
|---|---|---|
| 5,239,859 A | 8/1993 | Lehmann |
| 5,907,093 A | 5/1999 | Lehmann |
| 5,915,270 A | 6/1999 | Lehmann |
| 5,962,776 A | 10/1999 | Lehmann |
| 6,082,184 A | 7/2000 | Lehmann |
| 6,196,056 B1 | 3/2001 | Ewing et al. |
| 6,202,477 B1 | 3/2001 | Lehmann |
| 6,305,215 B2 | 10/2001 | Lehmann |
| 6,439,033 B1 | 8/2002 | Lehmann |
| 6,439,039 B1 | 8/2002 | Davison et al. |
| 6,575,016 B2 | 6/2003 | Lehmann |
| 6,829,936 B2 | 12/2004 | Lehmann |
| 7,000,456 B2 | 2/2006 | Lehmann |
| 2005/0079620 A1 | 4/2005 | Eberhard et al. |
| 2007/0187586 A1* | 8/2007 | Geist et al. ............... 250/288 |
| 2008/0060415 A1 | 3/2008 | Butler et al. |
| 2008/0060421 A1 | 3/2008 | Muller et al. |
| 2008/0148819 A1* | 6/2008 | Sasaki et al. ............... 73/40.7 |
| 2011/0113862 A1 | 5/2011 | Maehira et al. |

OTHER PUBLICATIONS

Voice 200 (Syft Technologies); Copyright 2007; pp. 1-3.
Real-time Resolution of Analytes, without Chromatographic Separation; Copyright 2004 Syft Technologies, Ltd.; pp. 1-3.
Voice200 SIFT-MS at Its Best; (syft Technologies); pp. 1-2.
From Flowing afterglow to SIFT-MS-the emergence of commercially viable SIFT-MS instruments; Copyright 2004 Syft Technologies Ltd., Feb. 24, 2004; pp. 1-4.
International Search Report; International Application No. PCT/EP2010/066058; Mailing date: Jun. 9, 2011 and Written Opinion of International Searching Authority.

* cited by examiner

METHOD AND APPARATUS FOR LEAK TESTING CONTAINERS

RELATED APPLICATIONS

This application is a continuation-in-part application under 35 U.S.C. §120 of U.S. application Ser. No. 12/869,492 filed Aug. 26, 2010 now abandoned and claiming priority under 35 U.S.C. §119 of European patent application no. 10172402.9 filed Aug. 10, 2010. The complete disclosure of the parent application Ser. No. 12/869,492 is hereby incorporated by reference.

TECHNICAL FIELD

The present invention relates to the field of leak testing closed containers which are filled with a product to be stored therein up to release of such product from the container by its opening at a desired moment. We call such product throughout the present description and claims "consumer product".

Thereby, the term "leak" shall be understood under a broad aspect addressing any transition of a material, the material composition thereof being dependent from the consumer product, through the encapsulation of such consumer product by the closed container. Thus, it may be said that leakiness may also be considered under the aspect of diffusion characteristics of the encapsulation by the container with respect to a material which is dependent from the consumer product.

BACKGROUND OF THE INVENTION

Various ways of evaluating whether a container is leaky or not are known.

One known technique to evaluate leakiness of a container is the so called tracer gas technique. Thereby, a tracer gas as e.g. helium or another noble gas, nitrogen or hydrogen is introduced into the container. Then the container is closed. Transition of tracer gas through the now close encapsulation by the container is monitored—sniffed in the surrounding of the container for leak testing purposes. This technique is therefore also known as sniffer technique. For the purpose of sniffing whether tracer gas transits from the interior of the container to its surrounding it is known to apply mass spectrometry. With respect to such an approach attention is drawn e.g. on the DE 33 40 353.

The tracer gas which is present in the closed container in tracer gas technique is provided exclusively for leak testing purposes and is thus not or does not form part of the consumer product to be stored within the container.

This is even true if such tracer gas, e.g. Nitrogen, is filled into the container simultaneously with a consumer product but exclusively with the target of subsequent Nitrogen sniffing.

A further technique known for testing leakiness of close containers filled with a consumer product may be addressed, generically, as pressure course technique. Thereby, a pressure difference is applied between the inside and the surrounding of the close and filled container. This may be performed by lowering the pressure in the surrounding of the container relative to the pressure inside the closed container. This approach resides upon the fact that if the container is leaky, there occurs pressure equalization between the inside of the container and its surrounding. A course of pressure in the surrounding of the container may be sensed and exploited as a leak indicative signal. With respect to such leak testing techniques, realized by lowering the pressure in the surrounding of the container with respect to the (initial) pressure inside the container, we may refer e.g. to U.S. Pat. No. 5,029,464, U.S. Pat. No. 5,170,660, U.S. Pat. No. 5,239,859, U.S. Pat. No. 5,915,270, all of the same applicant as the present application.

An improvement over the technique just addressed, especially for leak testing closed containers with a consumer product comprising a free liquid which covers at least a part of the inner surface of the container may be addressed generically as vaporizing technique. In this technique the pressure in the surrounding of the container is lowered at least to vapor pressure of a liquid component of the consumer product. There results that any such liquid component which is exposed, as through a leak, to the addressed vapor pressure is high-rate evaporated into the surrounding. This leads to a highly significant, accurately detectable leak indicative pressure course in the surrounding. With respect to this technique we may refer to U.S. Pat. No. 5,907,093, U.S. Pat. No. 6,082,184, U.S. Pat. No. 6,202,477, U.S. Pat. No. 6,305,215, U.S. Pat. No. 6,439,033, U.S. Pat. No. 6,575,016, U.S. Pat. No. 6,829,936, U.S. Pat. No. 7,000,456 and further related patent documents, all of the same applicant as the present application.

Moreover, a further known leak testing technique is based on mechanical squeezing the close containers filled with a consumer product as e.g. disclosed in U.S. Pat. No. 6,439,039 of the same applicant and/or are based on impedance measurement in the surrounding of the closed container filled with a consumer product as disclosed in the U.S. Pat. No. 5,962,776, also of the same applicant as the present application.

SUMMARY OF THE INVENTION

It is an object of the present invention to further push forwards leak detection accuracy for closed containers which are filled with a consumer product. This is achieved by a method for leak testing containers filled with a consumer product, comprising the step of monitoring presence in the surrounding of the container of at least one analyte, the material composition thereof being dependent from the consumer product and exploiting a result of said monitoring as leak indicative, the monitoring comprising mass spectrometry.

The consumer product may be solid, liquid or gaseous or comprise material in two or three of the addressed states of aggregation.

When we address that the analyte, presence of which being monitored in the surrounding of the container, has a material composition which is "dependent" from the consumer product, this shall mean that at least one component of the analyte is equal to a component present in the consumer product and/or that at least one component of the analyte results from a chemical reaction or from a physical treatment into which the consumer product is involved as a source material. Thus and as examples, the analyte may be the unchanged consumer product, the consumer product in a changed state of aggregation, e.g. changed from solid to gaseous, the consumer product in a changed chemical composition e.g. due to decomposition over time, one or more than one unchanged component of the consumer product, one or more than one component of the consumer product in a changed state of aggregation, e.g. changed from solid to gaseous, one or more than one component of the consumer product in a changed chemical composition, e.g. due to decomposition over time.

In one mode of the method according to the invention the consumer product comprises at least one of a solid and of a liquid product material and the analyte is dependent on at least one of said product materials.

With respect to the term "dependent" from at least one product material, the analogue definition applies as was defined for dependency from consumer product.

In one mode of the method according to the present invention the analyte is in gaseous state or the analyte is in solid and/or liquid state and converted in gaseous state before performing said mass spectrometry.

In a further mode of the method according to the invention the consumer product comprises material in gaseous state and the analyte depends from such material in gaseous state.

In one mode of the method according to the invention the mass spectrometry comprises applying a quadrupole mass spectrometer arrangement.

In a further mode of the method according to the invention the mass spectrometry comprises applying selected ion flow tube mass spectrometry, SIFT.

With respect to this SIFT mass spectrometric technique we refer e.g. to:

"SIFT-MS", Selected Ion Flow Tube mass spectrometry, Technology Overview, 2007, Syft Technologies, New Zealand;

Syft Technologies, White Paper, Mar. 5, 2004, Real-time Resolution of Analytes, without Chromatographic Separation;

Syft Technologies, White Paper, Feb. 24, 2004, From flowing afterglow to SIFT-MS—the emergence of commercially viable SIFT-MS instruments;

New product announcement from Syft Technologies New Zealand, Voice 200 SIFT-MS at Its Best.

In a further mode of the method according to the present invention a conditioning step is performed upon the surrounding into which the container is to be applied and if necessary up to an input of a mass spectrometer to perform mass spectrometry.

By such a conditioning step the surrounding into which the container is positioned for testing and possibly its operational connection to mass spectrometry is freed from contaminants which could adversely influence accuracy especially of the mass spectrometric monitoring. Such contaminants may e.g. be adsorbed in surfaces and desorbed therefrom at unknown rate.

Such conditioning step may consist or comprise e.g.:
Heating up surfaces in the surrounding e.g. for increased degassing rate;
Cooling down such surfaces e.g. to diminish degassing rate;
Flushing with a gas, e.g. with nitrogen;
Reactive plasma etch-cleaning.

In a further mode of the method according to the present invention the consumer product within the container is subjected to a preparatory step of increasing or establishing a leak rate of the analyte if a leak is present.

Such preparatory step with the target of at all enabling a flow rate of analyte to occur or of increasing such flow rate is directed upon influencing the consumer product within the container. Such preparatory step may consist or comprise:
heating up the product, e.g. to vaporise at least a part of the consumer product;
cooling down the product e.g. to prevent undesired components of the consumer product to influence the analyte;
increasing the pressure in the surrounding of the container relative to the pressure inside the container;
compressing the container by mechanical force;
lowering the pressure in the surrounding of the container relative to the pressure inside the container;
subjecting the container to centrifugation;
subjecting the container to shaking;
subjecting the consumer product to an electromagnetic field;
subjecting the consumer product to light radiation, in the visible and/or invisible spectrum.

In a further mode of the method according to the present invention a gasifying step for the analyte is performed before the analyte is applied to the mass spectrometry.

As was addressed above the analyte being monitored in the surrounding of the container may be in gaseous but also in liquid or solid state.

For the mass spectrometry step which finally is decisive for classifying the container being tested as unleaky, the analyte must be present in gaseous state. Therefore and if the analyte will be present in the surrounding of the container, including containers' outer surface, in liquid and/or solid state if a leak is present, the addressed gasifying step is performed.

Such a gasifying step may e.g. be realized by
heating the surrounding inclusive the outer surface of the container to melt and/or vaporize the analyte
lowering the pressure in the surrounding of the container to or below a vapor pressure of a liquid analyte.

Further, it should be considered that if a container is leaky, this may be to such an extent that directly applying the analyte to mass spectrometry would lead to a long recovery time of the mass spectrometry equipment or even to its breakdown up to its complete reconditioning.

The present invention has thus recognized that known leak testing methods are perfectly suited to first monitor whether the closed container filled with the consumer product is leaky to such an extent, that mass spectrometry should not be applied.

Thus, in a further mode of the method according to the present invention the container is subjected to a leak detection step without mass spectrometry, and the mass spectrometry is only performed if the result of the leak detection step without mass spectrometry reveals leakiness less than to a predetermined amount.

If the leak detection step, which is performed without making use of mass spectrometry, reveals that the container leaks more than a predetermined threshold amount, then the addressed container is barred from being operationally connected to the mass spectrometry and is rejected as leaky.

Such preceding leak detection step may in fact be performed by any known leak detection technique. Nevertheless and in view of the fact that mass spectrometry, as exploited according to the present invention for finally attributing to a container being tested to be unleaky, operates on vacuum input, in a further mode of the method according to the invention the leak detection step without mass spectrometry comprises evacuating the surrounding of the container and exploiting the time course of pressure in the surrounding of the container as a leak indicative signal and as control signal for enabling mass spectrometry.

In a further mode of the method according to the invention the addressed evacuation is performed towards a vacuum target value below vapour pressure of a component of the consumer product which is liquid and possibly covers at least a part of the inner surface of the wall or, more generically, of the encapsulation realised by the container. With respect to realisation of the leak detection step without mass spectrometry in a today's preferred form we refer to the disclosure thereof in the U.S. Pat. No. 5,907,093, U.S. Pat. No. 6,082,184 which are integrated to the present description by reference.

In a further mode of the method according to the present invention the analyte is generated in the surrounding of the container in gaseous state, if a leak is present. Then there is isolated a probe of the gas from the addressed surrounding within a probe chamber. The probe of gas with the leak indicative amount of analyte is applied to the mass spectrometry.

By this mode on one hand the time amount needed for final leak testing by mass spectrometry becomes decoupled from the time amount a container is at all available for testing purposes. The probe in the probe chamber may be tested even if the respective container has been conveyed to a remote place. This is to be considered if the method according to the invention operates on containers which are inline conveyed in a stream to and from the leak testing station. On the other hand the volume of the probe chamber may be selected small to prevent flushing input to the mass spectrometry. Further, one may select in the surrounding of the container an appropriate locus from which the probe is to be taken. This allows to selectively take such probe, e.g. distant from walls or sealing members of a test chamber for the container and/or distant from the container, i.e. at a locus where e.g. contamination by absorbed and desorbed material is minimal.

Establishing the addressed probe in the probe chamber may be done by providing, as an initial condition in the probe chamber, a pressure which is lower than the pressure in the surrounding of the container and having these pressures equalizing e.g. by opening an intermediate valve.

Nevertheless, the approach of providing the addressed probe chamber opens further the possibility in one mode of the invention to increase the pressure and thus gas density in the probe chamber relative to the density in the surrounding of the container. In one mode of the method according to the present invention this is realized by pumping the probe from the surrounding into the probe chamber. Thereby, the concentration (amount per volume) of analyte in the probe chamber may be risen which may improve detection accuracy by the mass spectrometry.

In a further embodiment of the method according to the invention which may be combined with every mode addressed above, all containers are tested as conveyed in a stream of containers e.g. on a conveyor moving continuously or in steps.

In spite of the fact that multiple mass spectrometry arrangements might be provided to allow leak testing at the rate the containers are conveyed towards the respective testing location, e.g. by operating such arrangements in parallel, in one mode of the just addressed method according to the invention subsequent containers of the stream of containers are placed within respective test chambers and there is established, in a controlled time multiplexed manner, an operational connection between respective ones of the interiors of the test chambers and an input port to a single arrangement performing the mass spectrometry.

One mode of the method according to the invention comprises
  controllably connecting each of the test chambers, moved as a test chamber stream, to a respective output gas-line,
  providing at least two collector chambers,
  moving said collector chambers into gas stream communication with respective ones of said output gas-lines and collecting in said at least two collector chambers a dose of gas from respective different ones of said output gas-lines,
  providing an input line to said mass spectrometry,
  sequentially moving one of said collector chambers after the other of said collector chambers with said respectively collected dose into gas stream communication with said one input line to said mass spectrometry and dispatching sequentially one of said doses after the other into said input line.

The present invention is also directed on a method of manufacturing closed containers filled with a consumer product and which are unleaky, comprising providing a container, filling the container exclusively with a consumer product which the container is intended to store, closing the filled container and subjecting the closed and filled container to the method of leak testing as was addressed above under at least one of its different modes and establishing the container to be unleaky in dependency of the result of the monitoring by the addressed method of leak testing.

The object as addressed above is further resolved by an apparatus for leak testing closed and filled containers according to the present invention, comprising a conveyor arrangement for inline conveying a multitude of the containers towards, through and from a leak testing station, the leak testing station comprising a mass spectrometer controllably operationally connectable to a surrounding of each of the containers, an output signal of the mass spectrometer being decisive for unleakiness of each container.

One embodiment of the apparatus according to the invention comprises, conveyed in said leak testing station by a conveyor, at least two sealingly closable test chambers each to accommodate at least one of the containers, the mass spectrometer being controllably operationally connectable to the inside of each of the test chambers in a consecutive manner.

One embodiment of the apparatus according to the invention comprises a leak testing stage operating without mass spectrometry and generating a leak indicating signal for each of the containers, the leak indicating signal disabling an operational connection of the inside of a respective test chamber to the mass spectrometer.

According to one embodiment of the apparatus according to the invention each of the test chambers is controllably connected to an evacuating arrangement and to at least one pressure sensor, the output of the pressure sensor is operationally connected to an input of an evaluation unit generating an output signal indicating a leak of a container under test in the respective test chamber, the output signal disabling an operational connection from said respective test chamber to said mass spectrometer.

One embodiment of the apparatus according to the invention comprises a multiplexing arrangement time multiplexing an operational connection of the test chambers to the mass spectrometer.

In one embodiment of the apparatus according to the invention the mass spectrometer is controllably operationally connected to the inside of each of said test chambers via a respective probe chamber.

In one embodiment of the apparatus according to the invention the volume of the probe chamber is smaller than the difference volume of the inside volume of the test chamber and of the volume of the container to be accommodated in the test chamber.

In one embodiment the mass spectrometer is controllably operationally connected to the inside of each of said test chambers via a respective probe chamber and a pumping arrangement.

A further embodiment of the apparatus according to the invention further comprises a drivingly movable collector arrangement comprising at least two collector chambers each with a chamber input opening and with a chamber output opening. It further comprises gas stream lines, each controllably operationally connected to one of the conveyed test chambers and each having a line output. It further comprises a mass spectrometer input line operationally connected to the mass spectrometer and having a line input. Thereby the collector arrangement is moveable in a manner that, on one hand, the chamber input openings are consecutively positioned in gas flow communication with a respective one of the line outputs and that, on the other hand, the chamber output openings are consecutively positioned in gas flow communication with the line input to the mass spectrometer.

In one embodiment of the apparatus according to the invention the mass spectrometer is a quadrupole mass spectrometer.

In one embodiment of the apparatus according to the invention the mass spectrometer is a selected ion flow tube mass spectrometer, SIFT.

One embodiment of the apparatus according to the invention comprises at least one of:
- a heating and/or cooling arrangement for a line arrangement interconnecting the outside surface of a respective container and the mass spectrometer;
- a flushing gas source in controlled communication with a line arrangement interconnecting the outside surface of a respective container and the mass spectrometer;
- a plasma source and a reactive gas source acting upon a line arrangement interconnecting the outside surface of a respective container and said mass spectrometer.

One embodiment of the apparatus according to the invention comprises at least one of:
- a heating and/or cooling arrangement for said consumer product;
- a pressure and/or evacuation source controllably operationally connected to the surrounding of said container;
- a mechanical compressing arrangement for said container;
- a centrifuge and/or shaking arrangement for said container;
- an electromagnetic source generating an electromagnetic field in said container;
- a light source generating light radiation in said container.

One embodiment of the apparatus according to the invention comprises at least one of:
- a heating arrangement for the surrounding of said container;
- a vacuum source controllably operationally connected to the surrounding of said container.

BRIEF DESCRIPTION OF DRAWINGS

The invention shall be further explained by examples with the help of figures. The figures show.

DETAILED DESCRIPTION

As was already addressed, the present invention relates to the field of quality control of closed and consumer product filled containers, with respect to transition of a product which is materially dependent from the consumer product through the container encapsulation into its surrounding atmosphere and thus to leak testing in a broad sense. The method and apparatus according to the invention find application, e.g., in food industry and pharmaceutical industry.

Although the invention has been amply described and taught in the introductory part of the description, it shall be further exemplified with the help of figures.

Figure 1:
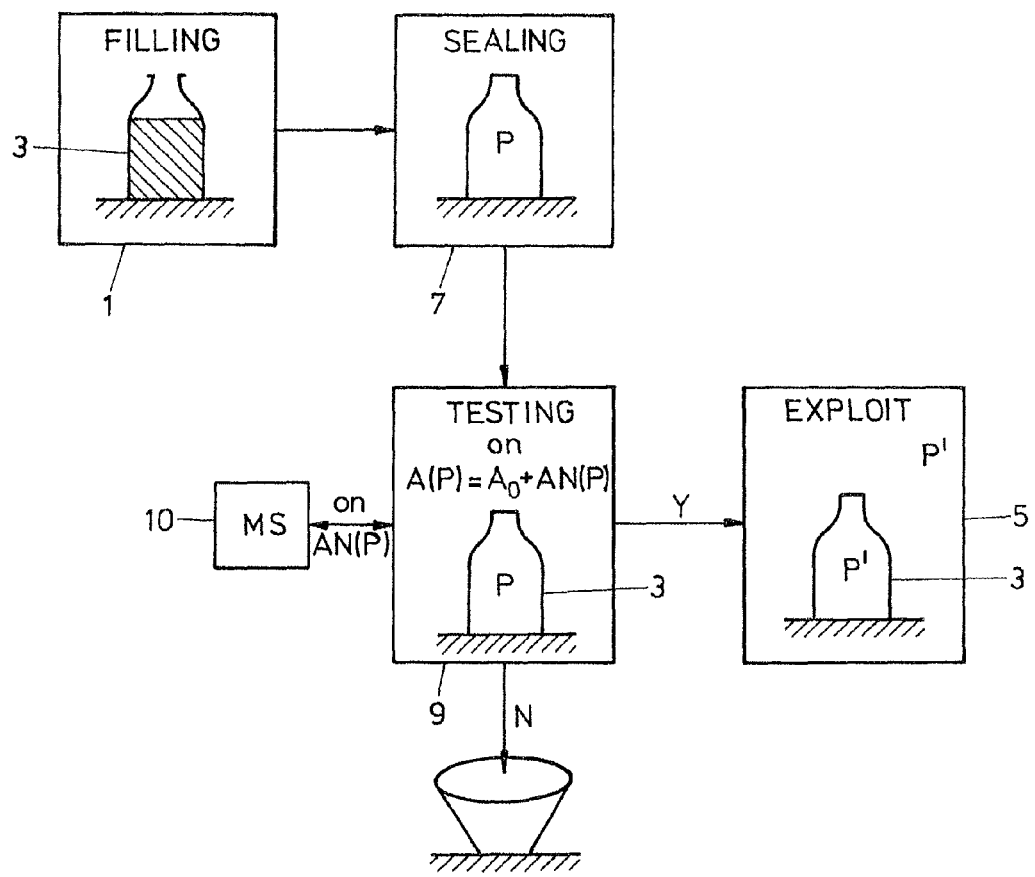
FIG. 1 generically and by means of a functional diagram, an apparatus according to the present invention and operating the methods according to the invention.

According to FIG. 1 there are most generically shown processing steps according to the present invention. This under all its aspects of a method for leak testing, a method of manufacturing unleaky containers and the respective apparatus.

In a step 1 addressed by "FILLING" a container 3 is filled with the product. If the filling product is not exclusively gaseous, there may or may not remain in the container 3 a space as shown in FIG. 1 filled with a gas. Irrespective of the fact whether the container 3 is filled with a gas and/or a liquid and/or a solid, we address the overall content of the container after the filling step as "consumer product" P. As may be seen in FIG. 1 a container 3 which has passed through processing according to the present invention is exploited in the step addressed by "exploit" 5. The product P' which is exploited from container 3 according to step 5 for a respective use is the product P which is present in the container 3 after the filling step 1 and sealing step 7 or the product P which has changed within the container 3 in the time span between filling/sealing and exploitation as by deterioration. This as if such container was not subjected to the testing step 9 according to the invention, but such container was filled, sealed and then just led to exploitation as e.g. delivered to a consumer.

In other words no product is added to the container 3 which would be specifically and exclusively provided to perform the specific processing step 9 according to the present invention. After the container 3 has been filled with the addressed consumer product P, the container is sealed as schematically shown in FIG. 1 by a sealing step 7. Such sealing is maintained during the subsequent processing step 9 up to exploitation in step 5. After performing the sealing step 7 the container is subjected to the analyzing or TESTING step 9. In this test or analyzing step 9 there is investigated, whether product P as contained in the container after sealing step 7 or a product which results from the product contained in the container 3 has an impact on the atmosphere A which surrounds the container 3 subjected to step 9. Thus, we may address the testing to be performed upon the atmosphere A which surrounds, during performing testing or analyzing, a sealed container 3 with respect to the fact whether the product P or a reaction product of product P has a material impact on atmosphere A. Such impact is dependent from product P and thus the resulting atmosphere is addressed in FIG. 1 by A(P). Thus we may say that the prevailing atmosphere surrounding a container to be tested is A(P) and consists of the surrounding atmosphere without any leakage, $A_0$ and the material impact depending from the consumer product and leakiness, AN (P) which we call analyte as it is the presence of this impact AN(P) which is monitored according to the invention to finally determine whether the container is unleaky.

If the analyzing or testing step 9 reveals by its result that the container does not fulfil predetermined conditions with respect to leakiness, then such container is rejected as addressed in FIG. 1 by the output arrow N for "no". Only if the addressed container having been analyzed or tested fulfils—Y—the addressed conditions, then it is freed for exploitation in generic step 5.

As has already been addressed before, the present invention resides on analyzing presence of an analyte AN(P) dependent from product P in the atmosphere A(P), by means of mass spectrometry, also called mass spectroscopy. Thus, the analyzing or testing step 9 of FIG. 1 includes or comprises mass spectrometry—MS—analyzing so as to finally conclude upon unleakiness of the container—Y—. Please note again that the product of the container as exploited—step 5—needs not necessarily be identical to the product in the container when sealed—step 7—due to possible container internal product reaction. Therefore, the product is addressed by P' in step 5.

Irrespective whether the product in the container has changed or not at the instance of performing the testing step 9, the analyte AN(P) which is monitored in this testing step is always dependent on the consumer product filled in the container.

Figure 2:
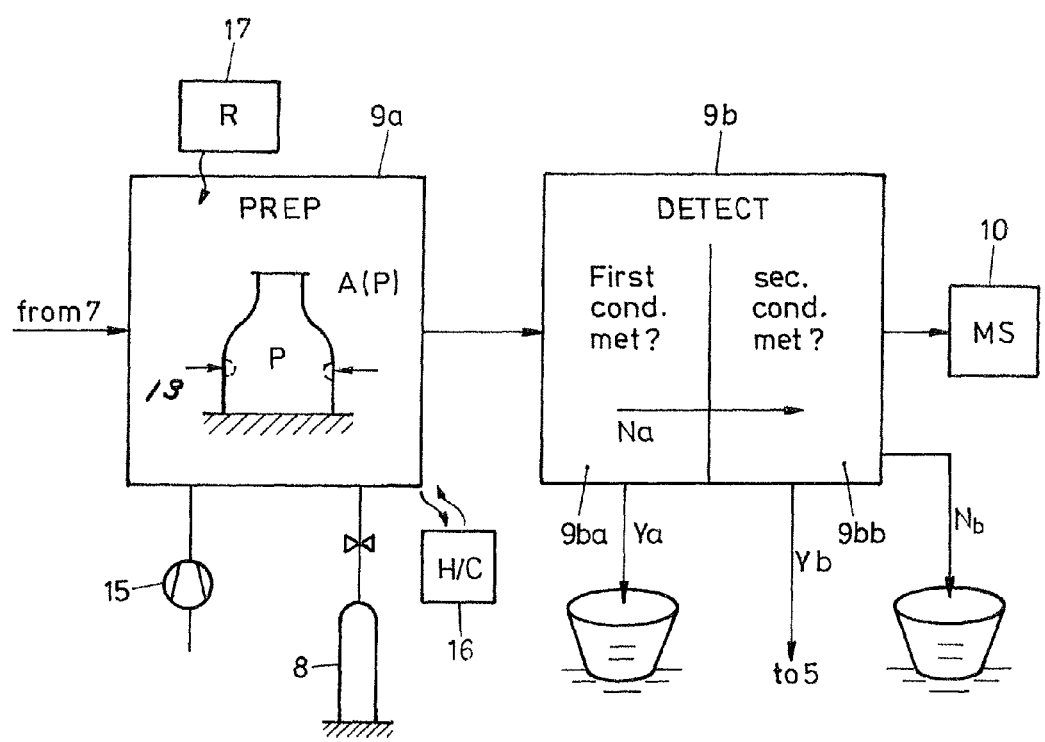
FIG. 2 in a representation in analogy to that of FIG. 1, generically more detailed the testing function as of FIG. 1 and as realized by the apparatus according to the invention operating the methods according to the invention.

Nevertheless and as will be schematically and principally explained in context with FIG. 2, it might be that a container analyzed in step 9 of FIG. 1 is checked upon fulfilling first predetermined conditions before a monitoring step by mass spectrometry is at all applied, i.e. to check on fulfilling second predetermined conditions. An example: If a container under test is heavily leaking it might be advisable not to have such container to interact with the mass spectrometry equipment so as not to overload or saturate such equipment by extensive amount of product pouring out of the container. This is achieved by detecting first whether the container is or is not heavily leaking (first predetermined conditions) and by only activating mass spectrometry analyzing if no heavy leaking is detected.

FIG. 2 most schematically and generically addresses such processing. After having performed the sealing step 7 as of FIG. 1 the testing or analyzing step 9 is performed. According to FIG. 2 this testing or analyzing step 9, as an example, may comprise a preparatory step "PREP" 9a upon the consumer product in the container.

The consumer product in the container may be in liquid state at any viscosity and/or in solid state as powderous and/or in gaseous state. Depending on the one or more than one aggregate state of the consumer product, it is advisable to perform the addressed preparing step so as to at all allow or to increase transition of the analyte AN(P) through a possibly existing leak in the container. As was addressed, such leak most generically may even include a respectively high diffusion rate through the wall of the container.

In this preparatory step PREP 9a e.g. in a testing chamber (not shown) the container 3 is e.g. pressurized with a pressurizing source of pressurised gas 8 and/or is mechanically compressed as shown at 13, if at least a part of the container wall is flexible. The preparatory step PREP 9a may further comprise evacuating the surrounding of the container as by a vacuum pump 15, heating or cooling the consumer product by a heating and/or cooling arrangement 16 or exposing the consumer product to electromagnetic or to light radiation 17. The preparatory step may thus provide for an interaction with the consumer product P which allows or facilitates transition of an analyte AN(P) dependent from the consumer product P through a leak into the atmosphere A(P) and which interaction only reversibly or only neglectably changes the consumer product P with respect to its desired exploitation.

After such preparatory step PREP 9a performed, the container is subjected to the detection step DETECT 9b of the overall testing or analyzing step 9. Thereby, as schematically shown in FIG. 2, as a first stage 9ba of the detection step 9b there is first detected whether the container being tested fulfils first leakiness conditions, i.e. has a large leak. If there is detected that such first conditions, as preestablished, are fulfilled—Ya—this means the container has a leakage in excess of a predetermined threshold extent. In this case the container is rejected. If the container being tested does not fulfil the addressed first conditions, i.e. has no "large leak" and is thus tight within the frame of the predetermined first tightness conditions, such container—Na—is subjected to the second detection step 9bb, which step is performed by monitoring with the mass spectrometry—10—thereby analyzing the surrounding atmosphere A(P) of the container upon presence of the analyte AN (P) and possibly upon the amount of AN(P) present. If and only if such monitoring by mass spectrometry reveals that the container fulfils the second predetermined conditions, e.g. has a leakiness below a predetermined extent, such container as addressed by $Y_{bb}$ is considered unleaky and is freed for further exploitation according to step 5 of FIG. 1, otherwise, as addressed by $N_b$, the container is rejected as leaky.

In FIG. 3 there is, again most schematically, shown one possibility of performing the two sub-step detection step 9b of FIG. 2. The container has been prepared according to step PREP 9a of FIG. 2 by evacuating a testing chamber 11 wherein the container to be tested is accommodated.

Operationally connected to the testing chamber 11, there is provided a pressure sensor arrangement 19 as well as the mass spectrometry equipment 21. The sub-detection step $9_{ba}$ for large leak detection is performed by evaluating the pressure course in the surrounding atmosphere A(P) of the container 3. This is addressed in FIG. 3 by pressure evaluation unit 23. With respect to such pressure evaluation technique we e.g. refer to the U.S. Pat. No. 5,907 093 and/or U.S. Pat. No. 6,305,215, both of the same applicant as the present application, which are with respect to large leak detection of liquid-filled containers to be considered as integrated part of the present description by reference.

Figure 3:
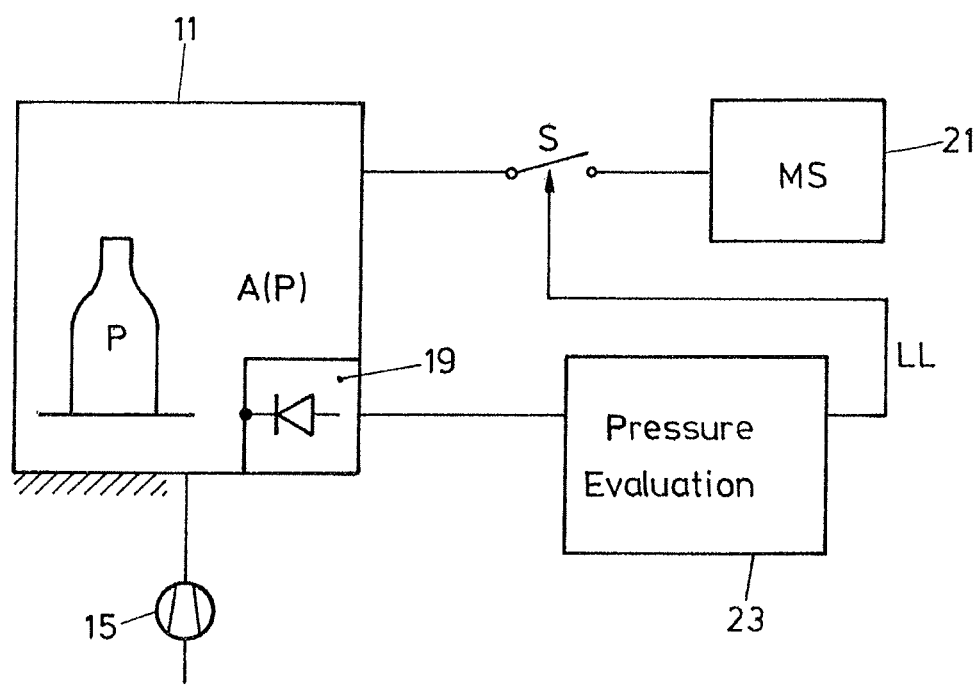
FIG. 3 still in a representation in analogy to those of FIGS. 1 and 2, one embodiment of performing testing according to an embodiment of the apparatus according to the invention operating a respective mode of the methods according to the invention.

If the pressure evaluation unit 23 detects leakiness in excess of a predetermined amount and as addressed by signal "LL" in FIG. 3, operational connection S of the test chamber 11 to the mass spectrometry equipment 21 is disabled. Only if pressure evaluation in unit 23 reveals that no large leak of the container is present, then operational connection S of the test chamber 11 to the mass spectrometry equipment 21 is enabled, i.e. S in FIG. 3 is closed.

As was addressed above, containers which are filled and sealed shall be tested or analyzed according to step 9 of FIG. 1, in one mode of the invention, in "inline" manner, i.e. the containers are then conveyed in a stream towards, trough and from a station whereat testing step 9 is performed. Especially such processing necessitates making use of a mass spectrometry equipment, which allows short-time consecutive analyzing. At the present moment it has been found that a SIFT-mass spectrometry technique as e.g. addressed in the papers mentioned above is most suited to be applied in the present invention.

Figure 4:
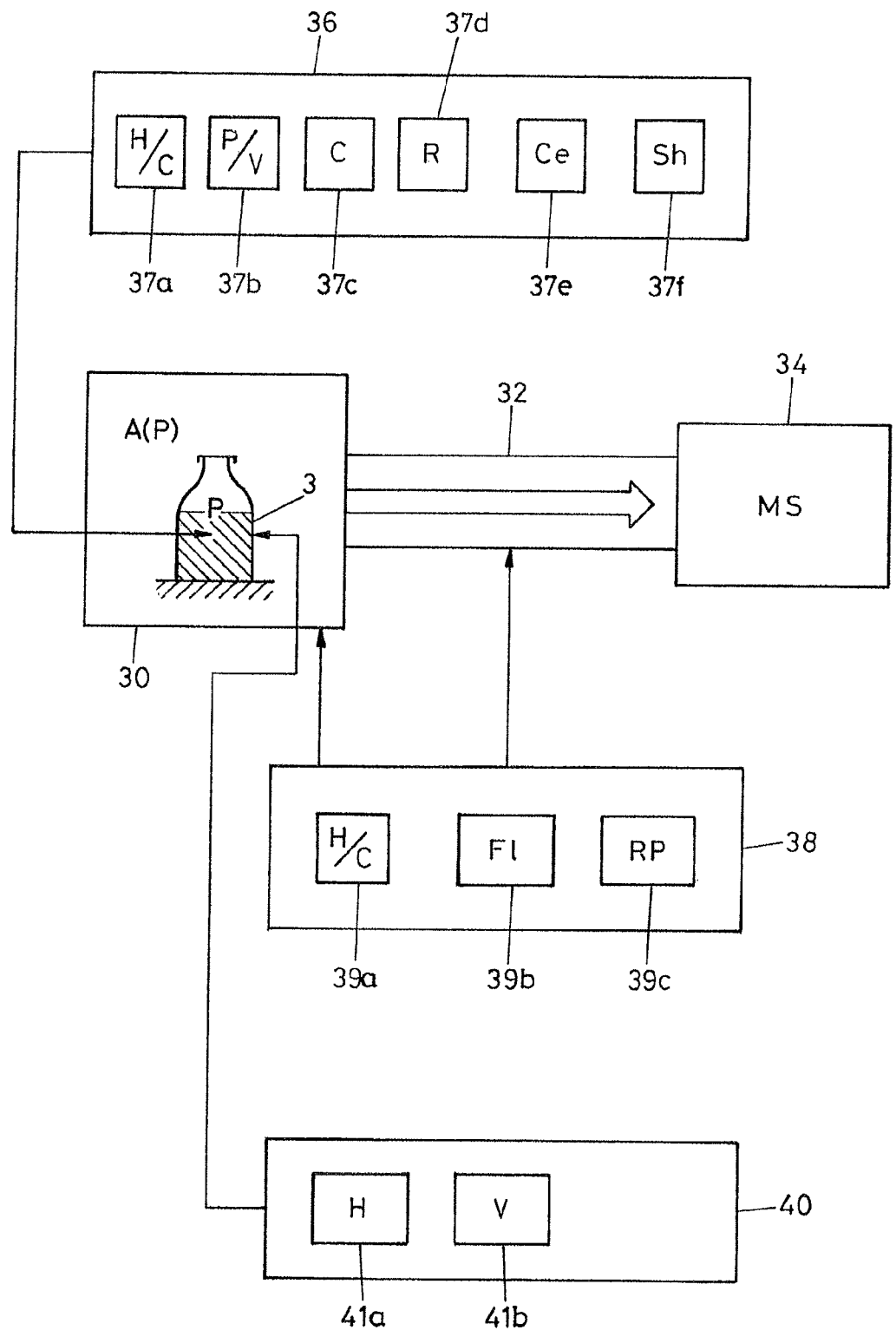
FIG. 4 in a schematic representation by means of a signal flow/functional block diagram, an apparatus according to the present invention operating the methods according to the invention with additional processing steps and respective processing arrangements.

In FIG. 4 there is schematically shown in a different representation, the main structures and steps as exploited by the present invention during the testing step 9 as of FIG. 1. The close container 3 with consumer product P is accommodated in a well-defined surrounding atmosphere which is initially $A_o$ and becomes, in dependency of the consumer product P, A(P). Depending on leakiness of the container 3 analyte AN(P) which is dependent of the consumer product P penetrates into the addressed surrounding leading to $A(P)=A_O+AN(P)$.

To establish such well-defined surrounding atmosphere $A_o$ the container 3 to be tested is accommodated in a test chamber 30. There is established a controlled operational connection as schematically shown in FIG. 4 by 32 between the inside of the test chamber 30 and the mass spectrometer 34.

As we have already addressed there may be performed before establishing the controlled operational connection 32 a preparatory step PREP 9a to the consumer product P within the container 3, by which there is enabled or increased a transition of the analyte depending on the consumer product P from the inside of the container 3 into the surrounding atmosphere A(P) in the test chamber 30 if the container 3 has a leak.

This preparatory step which has already been addressed in context with FIG. 2 is schematically shown in FIG. 4 by the block 36. The preparatory step interacts primarily with the consumer product P in the container 3. This step may be performed by a heater and/or cooling arrangement 37a and/or by a pressurizing or vacuumizing arrangement 37b for the inside of the test chamber 30 and/or by a compressing arrangement 37c by which the container 3 is compressed by mechanical forces and/or by a radiation unit 37d, by which the consumer product P is exposed to electromagnetic radiation and/or to light radiation in the visible and/or in the non-visible spectrum as to ultraviolet light.

Further, the preparatory step according to block 36 may comprise a centrifugating arrangement 37e and/or a shaking arrangement 37f, both for the container 3.

There is further advantageously provided a further step before applying the preparatory step according to block 36 which further step is a conditioning step and is represented in FIG. 4 by block 38. Generically by this conditioning step the atmosphere $A_o$ which is to surround the container 3, thus the inside of the test chamber 30 as well as of the operational gas-stream connection 32 between the inside of the test chamber 30 and the input to the mass spectrometer 34, is conditioned to remove or neutralize contaminants which have possibly been absorbed at rigid surfaces within the test chamber and the addressed operational connection 32 and which e.g. by desorption may negatively affect subsequent sensing accuracy by the mass spectrometer 34. Thus, generically the addressed conditioning step as of block 38 affects the test chamber as well as the system 32 providing for the operational connection between the test chamber 30 and the mass spectrometer 34. The conditioning step for the addressed interconnection between the test chamber 3 and the mass spectrometer input may be performed before and/or after the container 3 to be tested is accommodated in the test chamber 3. Such conditioning step may be performed e.g. by means of a heating and/or a cooling arrangement 39a and/or by a gas flushing arrangement 39b and/or by a reactive plasma etching arrangement 39b. By the reactive plasma etching arrangement a reactive gas as e.g. nitrogen, may be plasma activated and fed into the addressed system so as to clean solid surfaces which might have been contaminated.

If the consumer product P comprises material in liquid and/or solid aggregate state and thus the analyte which possibly transits through a leak of the container may as well be liquid and/or solid, there should be provided a further step of converting the addressed liquid or solid state of the analyte AN(P) into gaseous aggregate state. This further step is addressed by a gasifying step. According to FIG. 4 such gasifying step is represented by block 40. Generically, this step interacts with the analyte AN(P). This gasifying step may be performed by a heating arrangement 41a and/or by an evacuating arrangement 41b. By means of the heating arrangement a liquid and/or solid state analyte is gasified. By an evacuation arrangement a liquid analyte is gasified by lowering the pressure within the test chamber to or below vapour pressure of the liquid analyte.

When e.g. looking at the preparatory step 36 being possibly performed by an evacuation arrangement 37b and upon the gasifying step being possibly performed by an evacuating arrangement 41b, it becomes clear that a respective evacuating arrangement may operate for both, product preparation as well as gasifying. As an example, if in the preparatory step there is applied an evacuation arrangement 37b which evacuates the inside of the test chamber 3 to a pressure which is below vapour pressure of a liquid analyte, then such analyte is not only urged to the outside of the container due to lowering the pressure in the test chamber, but additionally such liquid analyte is gasified.

Figure 5:
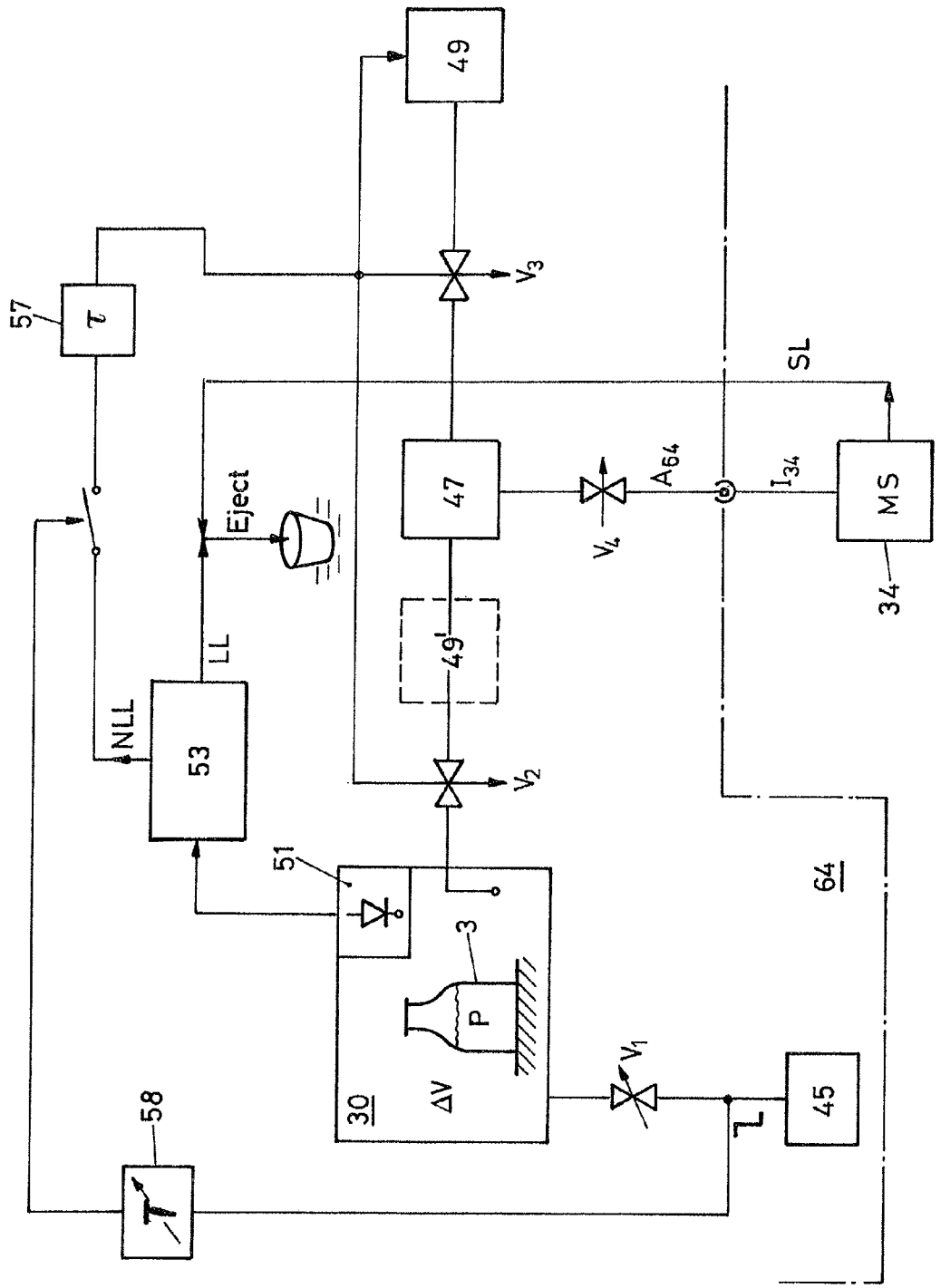
FIG. 5 by means of a simplified signal flow/functional block diagram, an apparatus according to the present invention operating the methods according to the present invention.

In FIG. 5 there is shown, schematically and simplified, an embodiment of an apparatus according to the present invention operating the method according to the invention. In test chamber 30 there has been accommodated a container 3 with consumer content P e.g. comprising a liquid component. A vacuumizing arrangement 45 is connected via controllable valve $V_1$ to the test chamber 30. Via a controllable valve $V_2$ the test chamber is further connected to a probe chamber 47 which is, via a valve $V_3$, operationally connected to a further vacuumizing arrangement 49. Via a controllable valve $V_4$ the probe chamber 47 is further operationally connected to the input $I_{34}$ of mass spectrometer arrangement 34.

By means of the vacuumizing arrangement 45, valve $V_1$ being open, the test chamber 30 is evacuated, thereby, as the consumer product P comprises a liquid component, preferably at least down to a pressure level according to vapour pressure of the addressed liquid component to be exploited as an analyte. By doing so on one hand such liquid component is urged through a possibly existing leak in the container 3, and as exposed to the low value pressure, is gasified by evaporation.

During a first time span it is determined whether the container 3 has a leak which is too large to allow connection of the test chamber 30 to the mass spectrometer arrangement 34. This is, as schematically shown in FIG. 3, performed by exploiting the pressure course in the test chamber 30 by means of a pressure sensor arrangement 51 and a pressure course evaluating unit 53. The pressure course evaluation unit generates an output signal LL if the pressure course within the test chamber 30 indicates that the container 3 has a leak which is larger than a predetermined extent. Occurrence of the signal LL directly leads to disabling the further leak testing operation and rejecting the container 3 presently under test as leaky. If the evaluation unit 53 detects that the container has no leak which is larger than the addressed predetermined extent, there is generated a "no large leak" signal NLL at an output of evaluation unit 53. Possibly after an adjustable time span T shown in FIG. 5 by delay unit 58 the NLL signal controls during a short time span τ as shown in FIG. 5 by a one-shot unit 57 opening of valve $V_2$ and of a valve $V_3$, and enables pumping arrangement 49. Thereby, a probe of gas is transferred from the test chamber 30 into the probe chamber 47. After the time span τ the valves $V_2$ and $V_3$ are closed again and the pumping arrangement 49 is disabled.

The time span T started e.g. after disabling evacuation of the test chamber 30 by the pumping arrangement 45 substantially influences the largeness of a leak which is detectable by the mass spectrometer 34. This because at a given leak rate at the container 3, the amount of analyte AN(P) present in the test atmosphere surrounding the container 3 in the test chamber 30 is substantially determined by the time integral of the leak rate over the time span T.

Therefore, generically the time span T is to be selected the longer the smaller the leaks are which are accurately to be detected.

Once the probe chamber 47 has been isolated on one hand from the test chamber 30 and on the other hand from the pumping arrangement 49, the valve $V_4$ is opened and the gas within the probe chamber 47 is analyzed. From the amount of analyte present in the gas probe and in dependency of the time span T, the leak rate and thus the largeness of one or more than one leak in the container 3 may be calculated.

The volume of the probe chamber 47 is thereby selected substantially smaller than the difference volume ΔV of the inner volume of test chamber 30 and the volume of container 3. The probe loaded in small probe chamber 47 may be tapped off from the test chamber 30 as schematically shown in FIG. 5 at a locus optimally remote from surfaces which might possibly falsify the analyte by gas desorption.

Further, due to the fact that the probe chamber 47 is relatively small, probe loading which is performed in a short time span τ does not cause turbulences in the test chamber 30 which might lead again to insignificant analyte concentration.

As shown in dash line pumping arrangement 49' may be interconnected between the probe chamber 47 and the test chamber 30. By doing so the gas pressure in the small probe chamber 47 may be risen to a value higher than the gas pressure in the test chamber 30. Thereby, the density of analyte in the probe chamber 49 is increased with respect to density in the test chamber 30, which increases the monitoring accuracy by the mass spectrometer 34.

If the mass spectrometer 34 monitors an amount of analyte in the gas probe which is higher than a predetermined threshold value there is generated, as schematically shown in FIG. 5, a small leak indicative signal SL which leads to ejection of the container 3 as did a large leakage indicative signal from evaluation unit 53, otherwise the container is freed for exploitation.

As has been addressed the present invention in one mode of the method as well as of the apparatus is directed on inline testing containers, which means the containers are conveyed towards, through and from a testing station, wherein testing according to the invention is performed.

Figure 6:
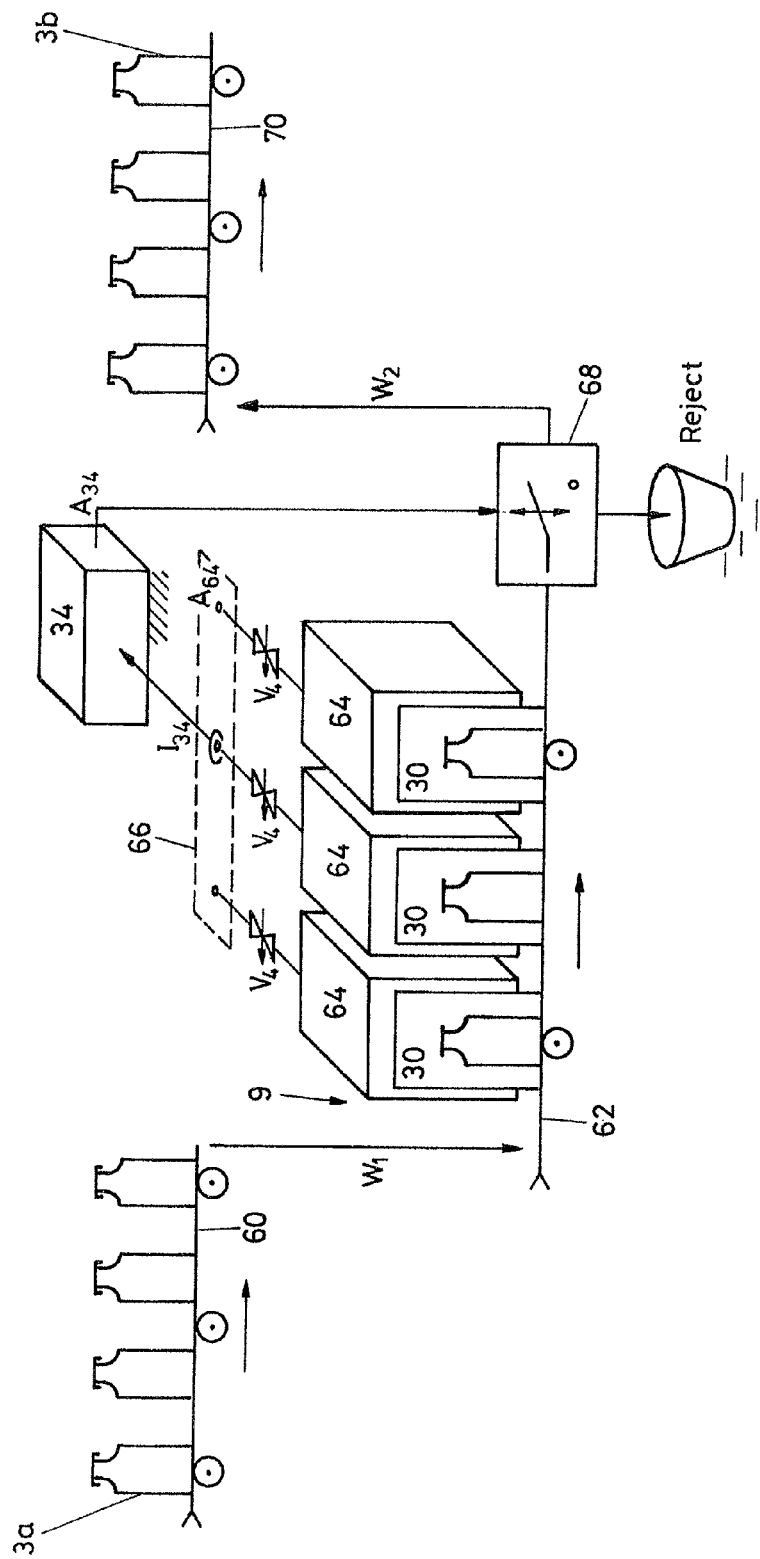
FIG. 6 in a simplified, schematic, perspectivic representation in the form of a signal flow/functional block diagram, an embodiment of the apparatus according to the present invention operating a mode of the methods according to the invention for inline testing of containers or inline manufacturing unleaky containers, and FIG. 7 in a simplified representation, one embodiment of a collector arrangement as provided e.g. in the embodiment of FIG. 6, operating one mode of the method according to the present invention.

According to FIG. 6 containers $3a$ of unknown leakiness characteristic are conveyed by a conveyer 60 from the filling and sealing stations 1 and 7 as shown in FIG. 1 towards a testing station 9 according to FIG. 1. In spite of the fact that container testing might be performed as the containers are conveyed on the conveyor 60, according to FIG. 6 the containers $3a$ of unknown leakiness characteristics are transferred to a testing conveyor 62 as schematically shown by the transition arrow $W_1$ in FIG. 6. On the testing conveyor 62 a test chamber 30 is applied to each container. To each test chamber 30 there is associated, moved by the conveyor 62, a test chamber evaluation unit 64 which may be, with an eye on FIG. 5, conceived like the unit 64 delimited by dash-dotted line in FIG. 5. Each test chamber evaluation unit 64 comprises a line output according to A64 in FIG. 5 which is to be brought in gas flow communication with an input $I_{34}$ to the mass spectrometer arrangement 34. The mass spectrometer arrangement 34 is thereby e.g. stationary with respect to conveyor 62. With the outputs A64 moving with the conveyor 62 and the input I34 stationary, there is performed as shown in FIG. 6 by dash lined unit 66, time multiplexing of the multitude of outputs A64 to the one input I34 to the mass spectrometer arrangement 34.

As further schematically shown in FIG. 6 the output signal of the mass spectrometer arrangement 34 controls a gate unit 68. If the output signal $A_{34}$ of the mass spectrometer arrangement 34 indicates leakiness of a container larger than a predetermined extent, then the gate unit 68 is controlled to reject the respective container. On the other hand, if the output signal $A_{34}$ of the mass spectrometer arrangement 34 indicates that the addressed container has not a leak which is equal or larger than the addressed predetermined extent, the respective container is transited, as shown by the arrow $W_2$, to an output conveyor 70 and is fed by this conveyor 70 e.g. to a packaging station for further exploitation according to step 5 of FIG. 1. These containers $3b$ are established as unleaky. The conveyor 70 may be the same conveyor as conveyor 60, and further as was addressed, the conveyor 62 may also be realized by the conveyor 60. In one embodiment at least conveyor 62, but possibly also conveyors 60 and/or 70 are realized by carousel-type conveyors.

Multiplexing the outputs $A_{64}$ of the test chamber evaluation units 64 to the one input $I_{34}$ to the mass spectrometer arrangement 34 is performed in one mode of realization, which is today preferred, via a collector arrangement. One realization form of such collector arrangement to perform the addressed multiplexing shall be explained with the help of FIG. 7. According to FIG. 7 the conveyor 62 of FIG. 6 is conceived as a carousel conveyor $62_K$. Along the periphery of conveyor $62_K$ a number of outputs $A_{64}$ according to the number of test chambers and test chamber units provided upon conveyor $62_K$ (not shown in FIG. 7) is provided as openings through the substantially plate-shaped carousel conveyor $62_K$. The carousel conveyor $62_K$ is drivingly rotatable about an axis $X_{62}$.

Figure 7:
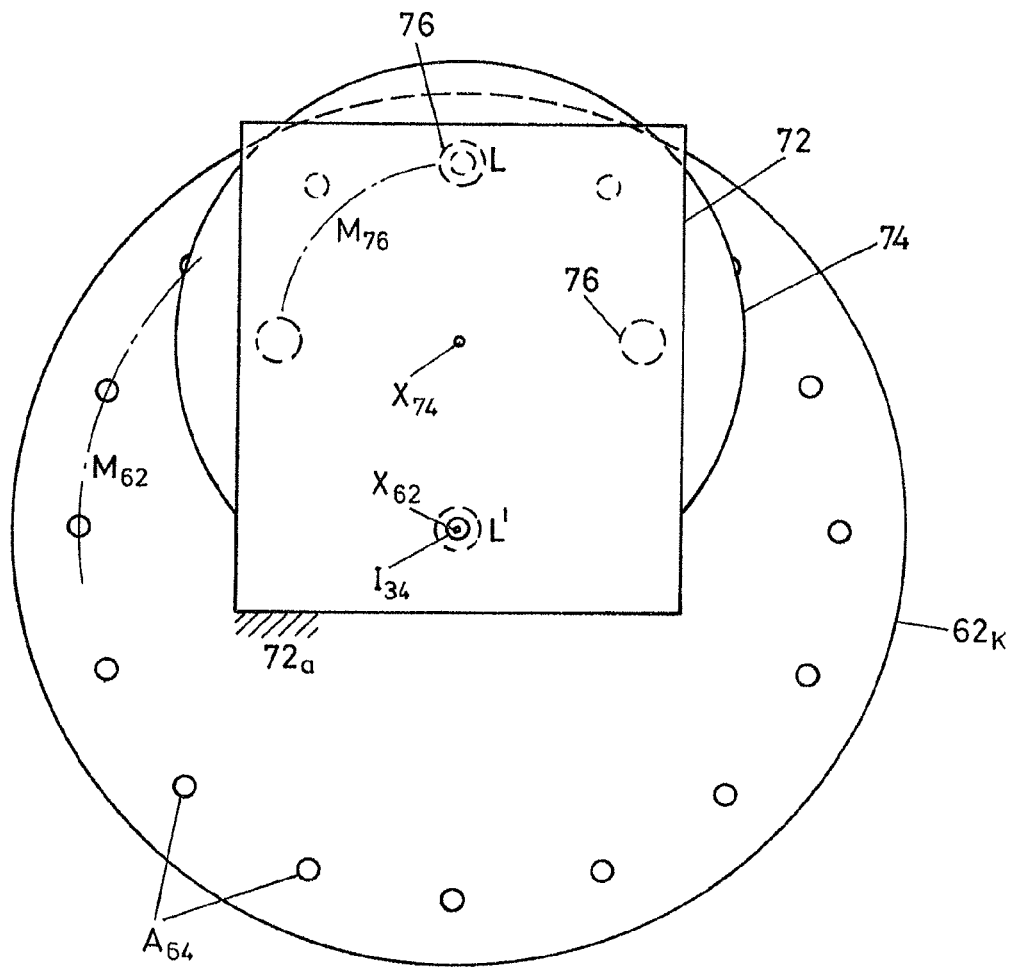

There is further provided a plate 72 which is shown in FIG. 7 for sake of clarity as a square plate. This plate 72 is coupled to the mass spectrometer arrangement 34 of FIG. 6 and is thus as schematised at $72_a$ stationary. The plate 72 has an opening shown in rigid line which is the input $I_{34}$ to the mass spectrometer arrangement 34 not shown in FIG. 7.

Sandwiched between the carousel conveyor $62_K$ and the stationary plate 72 there is provided a collector plate 74 which is rotatably drivable about an axis $X_{74}$. The collector plate 74 has, distributed along its periphery, collector chambers, according to FIG. 7 four of them, which are shown in FIG. 7 for clearness' sake with a larger diameter than the openings A64 and the opening I34. The collector chambers 76 are in fact through-openings through the collector plate 74. The moving path of the collector chambers 76, $M_{76}$, intersect the moving path $M_{62}$ of the output openings $A_{64}$ at a single locus L, where a collector chamber 76 may be brought in alignment with one of the output openings $A_{64}$. Thus, it is in this local position L that e.g. according to the embodiment of FIG. 5 by opening a respective valve $V_4$ gas from probe chamber 47 is flown into one of the collector chambers 76 of collector plate 74. Note that the plate 72 seals one side of the collector chambers 76, whereas the carousel conveyor $62_K$ seals the other side of the addressed collector chambers 76. Along the trajectory path $M_{76}$ the collector chambers are thus both sided sealed with the exception of the position L, where one of the collector chambers 76 is in free gas flow communication with one of the outputs $A_{64}$ and of a position L', where one of the collector chambers 76 is in gas flow communication with input $I_{34}$ to the mass spectrometer arrangement 34.

Thus, by providing a collector arrangement to collect gas probes from subsequent test chamber evaluations units 64 as of FIG. 6 and transporting such probes consecutively to the input I34 to the mass spectrometer, multiplexing as was addressed with reference 66 in FIG. 6 is performed.

Especially when the method and/or apparatus according to the present invention are conceived for inline container testing, it is highly recommended to apply a SIFT mass spectrometer equipment.

The present invention may also be considered under the following aspects:

The invention relates to the field of quality control and in particular leak testing.

It may be said a method for evaluating a quality of a number of closed filled containers filled with a filling product, such method comprising detecting at least one analyte by means of a mass spectroscopy technique, wherein said at least one analyte comprises at least one of
  said filling product;
  one or more components of said filling product;
  a decomposition product of said filling product;
  one or more decomposition products of one or more components of said filling product.

It addresses such method wherein the detecting is carried out for each of the number of containers.

Under one aspect at least one the analyte is detected in material that escaped from one of the number of containers, in particular wherein the material is a fluid, more particularly a gas.

Under one aspect the analyte is a fluid, in particular a gas.

Under one aspect if a tracer material is contained in the number of containers, the analyte is different from the tracer material.

Under one aspect the analyte is neither Nitrogen nor Helium, in particular wherein it is also not Argon.

Under one aspect the analyte comprises at least one organic compound.

Under one aspect the mass spectroscopy technique is a quadruple mass spectroscopy technique.

Under one aspect a soft ionization technique is used for ionization in the mass spectroscopy technique.

Under one aspect pre-defined precursors are ionized for generating particles for ionization in the mass spectroscopy technique, in particular water vapor is ionized for generating particles for ionization in the mass spectroscopy technique.

Under one aspect ions used for ionization in the mass spectroscopy technique are generated in a plasma, in particular in a microwave plasma.

Under one aspect ions used for ionization in the mass spectroscopy technique are selected by means of a quadruple magnetic field.

Under one aspect N different species of ions are used for ionization in the mass spectroscopy technique, wherein $1 \leq N \leq 6$, in particular $2 \leq N \leq 5$, more particularly $2 \leq N \leq 4$, even more particularly $N=3$.

Under one aspect the quality is or comprises a leak tightness of the containers.

Under one aspect the quality is or comprises an age of the containers.

Under one aspect the quality is or comprises a remaining time period before deterioration of the filled product.

Under one aspect the invention comprises determining, in dependence of a result of the detecting, a value indicative of the quality, in particular wherein the determining is carried out for each of the number of containers; and in particular wherein the value is determined in dependence of results of at least or exactly two such detecting steps, more particularly wherein the at least or exactly two detecting steps have been carried out at different times, and in particular wherein the value is dependent on a difference formed from said results of the at least or exactly two such detecting steps, and in particular wherein a pre-treatment is applied to the respective container between the at least or exactly two detecting steps.

Under one aspect the invention compres determining, in dependence of a result of the detecting, a value indicative of a leakage rate for leakage of the at least one analyte from the containers, in particular wherein the determining is carried out for each of the number of containers.

Under one aspect the invention comprises determining, in dependence of a result of the detecting, a value indicative of a leakage rate for leakage of said filled product from the containers, in particular wherein the determining is carried out for each of the number of containers.

Under one aspect the invention comprises determining, in dependence of a result of the detecting, a value indicative of a tightness of the containers with respect to the analyte, in particular wherein the determining is carried out for each of the number of containers.

Under one aspect the invention comprises determining, in dependence of a result of the detecting, a value indicative of a tightness of the containers with respect to the filled product, in particular wherein the determining is carried out for each of the number of containers.

Under one aspect the invention is carried out in an in-line fashion, in particular after a closing or sealing step for closing or sealing the containers.

Under one aspect of the invention a mass spectrometer is used for carrying out the detecting which is adjusted for specifically detecting the at least one analyte.

Under one aspect the invention comprises transporting the number of containers on a conveyor.

Under one aspect the invention comprises transporting the number of containers on a conveyor and rejecting containers having a result of the detecting beyond a threshold result.

Under one aspect detecting is carried out subsequently for different containers, a subsequent detecting step starting within 5 seconds after a start of a previous detecting step, in particular within 1 second, more particular within 0.5 seconds, even more particularly within 0.2 seconds.

Under one aspect the quality is or comprises a diffusion rate of the analyte out of the containers, in particular wherein the quality relates to a diffusion rate of the analyte out of the containers in excess to a threshold diffusion rate of the analyte out of the containers.

Under one aspect the quality is or comprises a diffusion rate of the analyte out of the containers, and comprises quantitatively determining the diffusion rate.

Under one aspect the invention comprises detecting at least two of the analytes by means of the mass spectroscopy technique, in particular detecting at least three of the analytes by means of the mass spectroscopy technique.

Under one aspect the invention comprises guiding material from the environment of each of the number of containers into a mass spectrometer used for carrying out the detecting, in particular wherein the material is extracted from an ambient air environment of each of the number of containers; or
  guiding material from the environment of at least two, in particular of two or of three or of four of the number of containers into a mass spectrometer used for carrying out the detecting, in particular wherein the material is extracted from an ambient air environment of the at least two of the number of containers.

Under one aspect the invention comprises inserting one of the containers or a portion thereof into a test chamber and carrying out the detecting at the test chamber, in particular doing so for each of the number of containers.

Under one aspect the invention comprises for each container of the number of containers:
  enclosing the respective container or a portion thereof in a test chamber, the test chamber comprising no further of the number of containers and no portion of a further of the number of containers;
  extracting material from the test chamber; and
  guiding the extracted material into a mass spectrometer used for carrying out the detecting.

Under one aspect a multitude of such test chambers are provided, and at one time, several of the test chambers enclose one container and a portion thereof, respectively.

Under one aspect the respective container and the portion thereof, respectively, is exerted to a pre-treatment in the respective test chamber, in particular the pre-treatment is carried out at the respective container before the detecting is carried out for the material extracted from the respective test chamber enclosing the respective container and the portion thereof, respectively.

Under one aspect the pre-treatment comprises at least one of
  increasing the pressure in the test chamber and/or effecting an overpressure in the test chamber;
  decreasing the pressure in the test chamber and/or effecting an underpressure in the test chamber;
  purging the test chamber and/or effecting a gas flow through the test chamber;
  increasing humidity in the test chamber and/or guiding water vapour into the test chamber;
  decreasing humidity in the test chamber;
  applying a mechanical force to at least one portion of the respective container, in particular so as to change a pressure inside the respective container and/or so as to deform said respective container;
  pushing or pressing at least one solid member against at least one portion of the respective container.

Under one aspect the invention comprises letting the respective container and the portion thereof, respectively, remain enclosed by the respective test chamber, in particular doing so for increasing a concentration of the at least one analyte in the respective test chamber with time.

Under one aspect the respective container and the portion thereof, respectively, remains enclosed by the test chamber for more than 1 second, in particular for more than 4 seconds, and/or wherein a time during which the respective container and the portion thereof, respectively, remains enclosed by the test chamber is chosen in dependence of a result of the detecting.

Under one aspect the invention comprises at least one of the steps
  applying a mechanical force to at least one portion of the respective container, in particular so as to change a pressure inside the respective container and/or so as to deform the respective container;
  pushing or pressing at least one solid member against at least one portion of the respective container;
  in particular wherein this is carried out before the detecting and/or during the detecting.

Under one aspect at least a portion of the container is at least substantially formed by a foil.

Under one aspect the invention comprises
  carrying out the detecting at one or more calibration sample containers, in particular by detecting the at least one analyte in material that escaped from at least one of the one or more calibration sample containers; and
  using results thereof for calibration.

Please note that all the aspects addressed to now may be combined unless being contradictory.

Further the invention may be considered under the still following aspects:

Under the aspect of an apparatus for evaluating a quality of closed filled containers filled with a filling product, the apparatus comprising a mass spectrometer adjusted for detecting at least one analyte, wherein the at least one analyte comprises at least one of
  the filling product;
  one or more components of the filling product;
  a decomposition product of the filling product;
  one or more decomposition products of one or more components of the filling product.

Under one aspect the invention further comprises a conveyor for transporting a multitude of the containers.

Under one aspect the invention further comprises an extraction unit structured and configured for extracting material from an ambient environment, in particular from an ambient environment of the containers, and a guiding unit structured and configured for guiding the extracted material to the mass spectrometer, in particular wherein the guiding unit is or comprises a capillary.

Under one aspect the invention comprises one or more test chambers each structured and configured for enclosing exactly one of the containers or a portion thereof and further comprising a handling unit structured and configured for moving at least one container and/or the one or more test chamber so as to accomplish that a respective container or a portion thereof is inserted into a respective test chamber and removed there from again.

Under one aspect the invention comprises at least one of
  a pressurizing unit structured and configured for increasing the pressure in at least one of the one or more test chambers and/or for effecting an overpressure in at least one of the one or more test chambers;
  a vacuumizing unit structured and configured for decreasing the pressure in at least one of the one or more test chambers and/or for effecting an underpressure in at least one of the one or more test chambers;
  a purging unit structured and configured for purging at least one of the one or more test chambers and/or for effecting a gas flow in at least one of the one or more test chambers;
  a humidifying unit structured and configured for increasing humidity in at least one of the one or more test chambers and/or for guiding water vapour into at least one of the one or more test chambers;
  a dehumidifying unit structured and configured for decreasing humidity in at least one of the one or more test chambers;
  a unit for applying a mechanical force to at least one portion of the respective container, in particular for changing a pressure inside the respective container and/or for deforming the respective container;
  a unit for pushing or pressing at least one solid member against at least one portion of the respective container.

Under one aspect the invention comprises an evaluation unit structured and configured for evaluating the quality for each of the containers from at least one detection result obtained by the mass spectrometer by detecting the at least one analyte for the respective container, in particular wherein the evaluation unit is structured and configured for evaluating the quality for each of the containers from at least or exactly two detection results obtained by the mass spectrometer by detecting the at least one analyte for the respective container at different times, in particular wherein the evaluation unit is structured and configured for determining a difference from the at least or exactly two detection results.

Under one aspect the apparatus is a container tightness tester.

Please note that the aspects as additionally addressed may all be combined unless being contradictory. This is also valid for the subsequently addressed aspects of the invention.

Under a further aspect the invention addresses a production line for producing closed filled containers, comprising at least one apparatus according to one of aspects addressed above.

Under one aspect the invention thereby further comprises a sealing unit structured and configured for closing said containers, in particular wherein the apparatus is connected to the sealing unit by means of a conveyor structured an configured for transporting the containers from the sealing unit to the apparatus.

Under one aspect the invention further comprises a filling unit structured and configured for filling the containers with the filling product, in particular wherein the filling unit is connected to the sealing unit by means of a conveyor structured an configured for transporting the containers from the filling unit to the sealing unit.

Under one aspect the invention addresses a use of a mass spectroscopy technique for evaluating a quality of a number of closed filled containers filled with a filling product by detecting at least one analyte by means of the mass spectroscopy technique, wherein the at least one analyte comprises at least one of
- the filling product;
- one or more components of the filling product;
- a decomposition product of the filling product;
- one or more decomposition products of one or more components of the filling product;
- in particular comprising extracting material from an environment of each of the number of containers or from an environment of two or more of the number of containers, and detecting the at least one analyte in the extracted material.

Under one aspect the invention addresses a method for determining a leak tightness of a number of closed filled containers filled with a filling product, the method comprising detecting at least one analyte by means of a mass spectroscopy technique, wherein the at least one analyte comprises at least one of
- the filling product;
- one or more components of the filling product;
- a decomposition product of the filling product;
- one or more decomposition products of one or more components of the filling product;
- in particular wherein said method comprises determining the leak tightness from a result of the detecting, and in particular wherein the method is carried out in an in-line fashion following a closing step for closing the containers.

Under one aspect the invention addresses a method for in-line leak-testing closed filled containers filled with a filling product, comprising for each of the containers the step of detecting at least one analyte by means of a mass spectroscopy technique, wherein the at least one analyte comprises at least one of
- the filling product;
- one or more components of the filling product;
- a decomposition product of the filling product;
- one or more decomposition products of one or more components of the filling product.

Under one aspect the invention addresses a method for manufacturing closed filled containers filled with a filling product, comprising for each container to be manufactured the steps of
- filling the respective filling product into the respective container or into a portion thereof;
- closing the respective container;
- extracting material from an environment of the respective of container;
- guiding the extracted material to a mass spectrometer;
- detecting by means of the mass spectrometer at least one analyte in the extracted material;
- wherein the at least one analyte comprises at least one of
- the filling product;
- one or more components of the filling product;
- a decomposition product of the filling product;
- one or more decomposition products of one or more components of the filling product.

Under one aspect the invention further addresses a method for manufacturing at least one closed container containing a consumer-product and which container does fulfil predetermined leakiness conditions comprising
- providing a closed container filled with said consumer-product
- establishing, whether such container fulfils at least one predetermined unleakiness condition comprising analyzing a surrounding of the container with respect to an impact on the surrounding from the consumer-product by means of mass spectroscopy.

Under one aspect such method further comprises first detecting whether the container has a leak in excess of a predetermined amount and subjecting the container only then to the mass spectroscopy if there is detected that the addressed container has no leak in excess of the amount.

Under one aspect detection of whether the container has a leak in excess of the amount is performed by evaluating the pressure in a surrounding of the container.

Under one aspect the invention addresses an apparatus for detecting leakiness of a container which is sealed and filled with a consumer product, comprising a mass spectroscopy arrangement which is established to analyze a gaseous surrounding of the container with respect to an impact which is dependent on the consumer product.

We repeat, that two or more aspects of the invention which have been addressed may be applied in any combination unless they are in mutual contradiction.

The invention claimed is:

1. A method for leak testing a container filled with a consumer product, comprising the step of monitoring presence in the surrounding of said container of at least one analyte that is not helium, the material composition thereof being dependent from said consumer product and exploiting a result of said monitoring as a leak indication, said monitoring comprising mass spectrometry, wherein the method comprises inline testing up to each container of a stream of said containers, and further comprises:
providing subsequent containers of said stream within respective rest test chambers moved as a test chamber stream and controllably time multiplexing an operational gas stream-connection from the interiors of said test chambers to an input port to a single arrangement performing said mass spectrometry by
controllably connecting each of said test chambers, moved as a test chamber stream, to a respective output line, providing at least two collector chambers which are distinct from the test chambers, moving said collector chambers into gas stream communication with respective ones of said output lines and collecting in said at least two collector chambers a dose of gas from respective different ones of said output lines, providing an input line to said mass spectrometry, sequentially moving one of said collector chambers after the other of said collector chambers with said respectively collected dose into gas stream communication with said one input line to said mass spectrometry and dispatching sequentially one of said doses after the other into said input line.

2. The method of claim 1, wherein said consumer product comprises at least one of a solid product material and of a liquid product material and said analyte is dependent on at least one of said product materials.

3. The method according to claim 2, wherein said analyte is in gaseous state or said analyte is in solid or liquid state and converted to gaseous state before performing said mass spectrometry.

4. The method of claim 1, wherein said consumer product comprises material in gaseous state and said analyte depends from said material in gaseous state.

5. The method according to claim 1, wherein said mass spectroscopy comprises applying a quadrupole mass spectrometer arrangement.

6. The method of claim 5, wherein said mass spectrometry comprises applying selected ion flow tube mass spectrometry, SIFT.

7. The method of claim 6, comprising a conditioning step upon the surrounding into which said container is to be applied.

8. The method of claim 1, comprising subjecting said consumer product within said container to a preparatory step of increasing or establishing a leak rate of said analyte if a leak is present.

9. The method of claim 1, comprising a gasifying step for said analyte before being applied to said mass spectrometry.

10. The method of claim 1, comprising subjecting said container to a leak detection step without mass spectrometry, and performing said mass spectrometry only if the result of said leak detection step without mass spectrometry reveals leakiness of less than a predetermined amount.

11. The method of claim 10, said leak detection step without mass spectrometry comprising evacuating the surrounding of said container and exploiting the time course of pressure in said surrounding of said container as a leak indicative signal and as control signal for enabling/disabling said mass spectrometry.

12. The method of claim 11, wherein said evacuation is performed towards a vacuum level target value below vapor pressure of a component of said consumer product which is liquid.

13. The method of claim 1, comprising generating, if a leak is present, said analyte in the surrounding of said container in gaseous state and isolating a probe of gas from said surrounding within a probe chamber and applying said probe from said probe chamber to said mass spectrometry.

14. The method of claim 13 comprising increasing pressure of said probe in said probe chamber relative to pressure in said surrounding.

15. The method of claim 14 comprising increasing said pressure by pumping said probe from said surrounding to said probe chamber.

16. Method of manufacturing closed containers filled with a consumer product and which are unleaky, comprising providing a container, filling said container exclusively with a consumer product which the container is intended to store, closing the filled container and subjecting the closed and filled container to the method of leak testing according to claim 1 and establishing said container to be unleaky in dependency of said result of monitoring by said method of leak testing.

17. Apparatus for leak testing closed and filled containers comprising a conveyor arrangement for inline conveying a multitude of said containers towards, through and from a leak testing station, said leak testing station comprising a mass spectrometer controllably operationally connectable to a surrounding of each of said containers, an output signal of the mass spectrometer being decisive for unleakiness of each container, further comprising, conveyed in said leak testing station by a conveyor, at least two sealingly closable test chambers each to accommodate at least one of said containers, said mass spectrometer being controllably operationally connectable to the inside of each of said test chambers, and further comprising a drivingly movable collector arrangement comprising at least two collector chambers which are distinct from the test chambers, the collector chambers each with a chamber input opening and with a chamber output opening, gas stream lines, each controllably operationally connected to one of said conveyed test chambers and each having a line output, a mass spectrometer input line operationally connected to said mass spectrometer and having a line input, said collector arrangement being moved so that said chamber input openings are consecutively positioned in gas flow communication with a respective one of said line outputs, and so that said chamber output openings are consecutively positioned in gas flow communication with said line input to said mass spectrometer.

18. The apparatus of claim 17, comprising a leak testing stage operating without mass spectrometry and generating a leak indicating signal for each of said containers, said leak indicating signal disabling an operational connection of said inside of a respective test chamber to said mass spectrometer.

19. The apparatus of claim 17, each of said test chambers being controllably operationally connected to an evacuation pump and to at least one pressure sensor, the output of said pressure sensor being operationally connected to an input of an evaluation unit generating an output signal indicating a leak of a container under test in the respective test chamber, said output signal disabling an operational connection from said respective test chamber to said mass spectrometer.

20. The apparatus of claim 17, wherein said drivingly movable collector arrangement is part of a multiplexing arrangement time multiplexing an operational connection of said test chambers to said mass spectrometer.

21. The apparatus of claim 17, wherein said mass spectrometer is controllably operationally connected to the inside of each of said test chambers via a respective probe chamber.

22. The apparatus of claim 21, wherein the volume of said probe chamber is smaller than the difference volume of the inside volume of said test chamber and of the volume of said container to be accommodated in said test chamber.

23. The apparatus of claim 17, wherein said mass spectrometer is controllably operationally connected to the inside of each of said test chambers via a respective probe chamber and a pumping arrangement.

24. The apparatus of claim 17, wherein said mass spectrometer is a quadrupole mass spectrometer.

25. The apparatus of claim 17, wherein said mass spectrometer is a selected ion flow tube mass spectrometer, SIFT.

26. The apparatus according to claim 17, comprising at least one of:
- a heating and/or cooling arrangement for a line arrangement interconnecting the outside surface of a respective container and said mass spectrometer;
- a flushing gas source in controlled communication with a line arrangement interconnecting the outside surface of a respective container and said mass spectrometer;
- a plasma source and a reactive gas source acting upon a line arrangement interconnecting the outside surface of a respective container and said mass spectrometer.

27. The apparatus of claim 17 comprising at least one of:
- a heating and/or cooling arrangement for said consumer product;
- a pressure and/or evacuation source controllably operationally connected to the surrounding of said container;
- a mechanical compressing arrangement for said container;
- a centrifuge and/or shaking arrangement for said container;
- an electromagnetic source generating an electromagnetic field in said container;
- a light source generating light radiation in said container.

28. The apparatus of claim 17, comprising at least one of:
- a heating arrangement for the surrounding of said container;
- a vacuum source controllably operationally connected to the surrounding of said container.

* * * * *